US011430283B2

(12) United States Patent
Mossoba et al.

(10) Patent No.: US 11,430,283 B2
(45) Date of Patent: Aug. 30, 2022

(54) METHODS AND SYSTEMS FOR DELIVERING A DOCUMENT

(71) Applicant: Capital One Services, LLC, McLean, VA (US)

(72) Inventors: Michael Mossoba, Arlington, VA (US); Abdelkader Benkreira, New York, NY (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/352,945

(22) Filed: Jun. 21, 2021

(65) Prior Publication Data
US 2021/0312749 A1  Oct. 7, 2021

Related U.S. Application Data

(63) Continuation of application No. 16/681,174, filed on Nov. 12, 2019, now Pat. No. 11,043,059.

(51) Int. Cl.
*G06Q 40/00* (2012.01)
*G07D 11/00* (2019.01)
*G07F 19/00* (2006.01)
*G07F 7/10* (2006.01)
*G06K 19/077* (2006.01)
(Continued)

(52) U.S. Cl.
CPC ..... *G07F 7/1008* (2013.01); *G06K 19/07749* (2013.01); *G06Q 20/04* (2013.01); *G06Q 20/10* (2013.01); *G06Q 20/341* (2013.01); *G06Q 20/385* (2013.01); *G06Q 20/40* (2013.01); *G06Q 40/00* (2013.01)

(58) Field of Classification Search
CPC ............ G07F 7/1008; G06K 19/07749; G06Q 20/04; G06Q 20/10; G06Q 20/341; G06Q 20/385; G06Q 20/40; G06Q 40/00; G06Q 20/1085; G06Q 20/18; G06Q 20/4012; G06Q 20/4014; G06Q 20/40155; G06Q 50/18; G06Q 10/00
USPC ......................................................... 235/379
See application file for complete search history.

(56) References Cited

U.S. PATENT DOCUMENTS 7,240,829 B2    7/2007  Graef et al.
7,268,899 B2 *  9/2007  Crumly ................. H04N 1/324
                                                      358/1.14
(Continued)

FOREIGN PATENT DOCUMENTS

WO        03007215 A1    1/2003
WO     2011086157 A1    7/2011

*Primary Examiner* — Tuyen K Vo
(74) *Attorney, Agent, or Firm* — Bookoff McAndrews, PLLC

(57) ABSTRACT

A computer-implemented method for delivering a document to a user may include obtaining, via an automated teller machine (ATM), first identification data of the user, wherein the first identification data of the user includes a card number and a password associated with the card number; determining a notification status of the user based on the first identification data; obtaining, via the ATM, second identification data based on the notification status of the user; determining a delivery status of the user based on the first identification data and the second identification data; and delivering the document to the user based on the delivery status of the user via the ATM.

20 Claims, 4 Drawing Sheets

(51) Int. Cl.
*G06Q 20/04* (2012.01)
*G06Q 20/10* (2012.01)
*G06Q 20/34* (2012.01)
*G06Q 20/38* (2012.01)
*G06Q 20/40* (2012.01)

(56) References Cited

U.S. PATENT DOCUMENTS

| | | |
|---|---|---|
| 7,567,924 B1 | 7/2009 | Drummond et al. |
| 8,387,864 B1 | 3/2013 | Blackson |
| 9,898,730 B2 | 2/2018 | Flitcroft et al. |
| 10,825,004 B1 * | 11/2020 | Walker ............... G07F 19/203 |
| 2002/0128969 A1 | 9/2002 | Parmelee et al. |
| 2007/0098224 A1 | 5/2007 | Morita |
| 2008/0154751 A1 | 6/2008 | Miles |
| 2009/0183008 A1 | 7/2009 | Jobmann |
| 2012/0272256 A1 | 10/2012 | Bedi |
| 2014/0089188 A1 | 3/2014 | Rao |
| 2014/0254893 A1 | 9/2014 | Phillips et al. |
| 2016/0005108 A1 | 1/2016 | Willis |
| 2016/0103963 A1 | 4/2016 | Mishra |

* cited by examiner

METHODS AND SYSTEMS FOR DELIVERING A DOCUMENT

CROSS-REFERENCE TO RELATED APPLICATION(S)

This patent application is a continuation of and claims the benefit of priority to U.S. Nonprovisional patent application Ser. No. 16/681,174, filed on Nov. 12, 2019, the entirety of which is incorporated herein by reference.

TECHNICAL FIELD

Various embodiments of the present disclosure relate generally to delivering a document, and, more particularly, to delivering a document to a user via an automated teller machine (ATM).

BACKGROUND

Traditional ways to deliver certain documents, such as certified documents, may include hand delivery, e-mail, or certified mail. However, these traditional ways may not be able to verify that the recipient receives such a document in a manner sufficient to satisfy one or more notice, reporting, compliance, or other requirements.

The present disclosure is directed to overcoming the above-referenced challenge. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for delivering a document to a user via an automated teller machine (ATM). The methods and systems may provide a mechanism that verifies that the recipient receives the document in compliance with any applicant requirement.

In an aspect, a computer-implemented method for delivering a document to a user may include: obtaining, via an automated teller machine (ATM), first identification data of the user, wherein the first identification data of the user includes a card number and a password associated with the card number; determining a notification status of the user based on the first identification data; obtaining, via the ATM, second identification data based on the notification status of the user; determining a delivery status of the user based on the first identification data and the second identification data; and delivering the document to the user based on the delivery status of the user via the ATM.

In another aspect, a computer-implemented method for delivering a document to a user may include: obtaining, via an automated teller machine (ATM), first identification data of the user; obtaining a first user identification based on the first identification data of the user, wherein the first user identification includes a user name; determining a notification status of the user based on the first user identification; obtaining, via the ATM, second identification data based on the notification status of the user, wherein the second identification data includes at least biometric data of the user; obtaining a second user identification based on the second identification data of the user, wherein the second user identification includes demographic information of the user; determining a delivery status of the user based on the first user identification and the second user identification; and delivering the document to the user based on the delivery status of the user via the ATM.

In yet another aspect, a computer system for delivering a document to a user may comprise a memory storing instructions and one or more processors configured to execute the instructions to perform operations. The operations may include: obtaining, via an automated teller machine (ATM), first identification data of the user; determining a notification status of the user based on the first identification data; obtaining, via the ATM, second identification data based on the notification status of the user; determining a delivery status of the user based on the first identification data and the second identification data; and delivering the document to the user based on the delivery status of the user via the ATM.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, in various embodiments data, such as first identification data and second identification data, may be used to determine a delivery status of the user.

Figure 1:
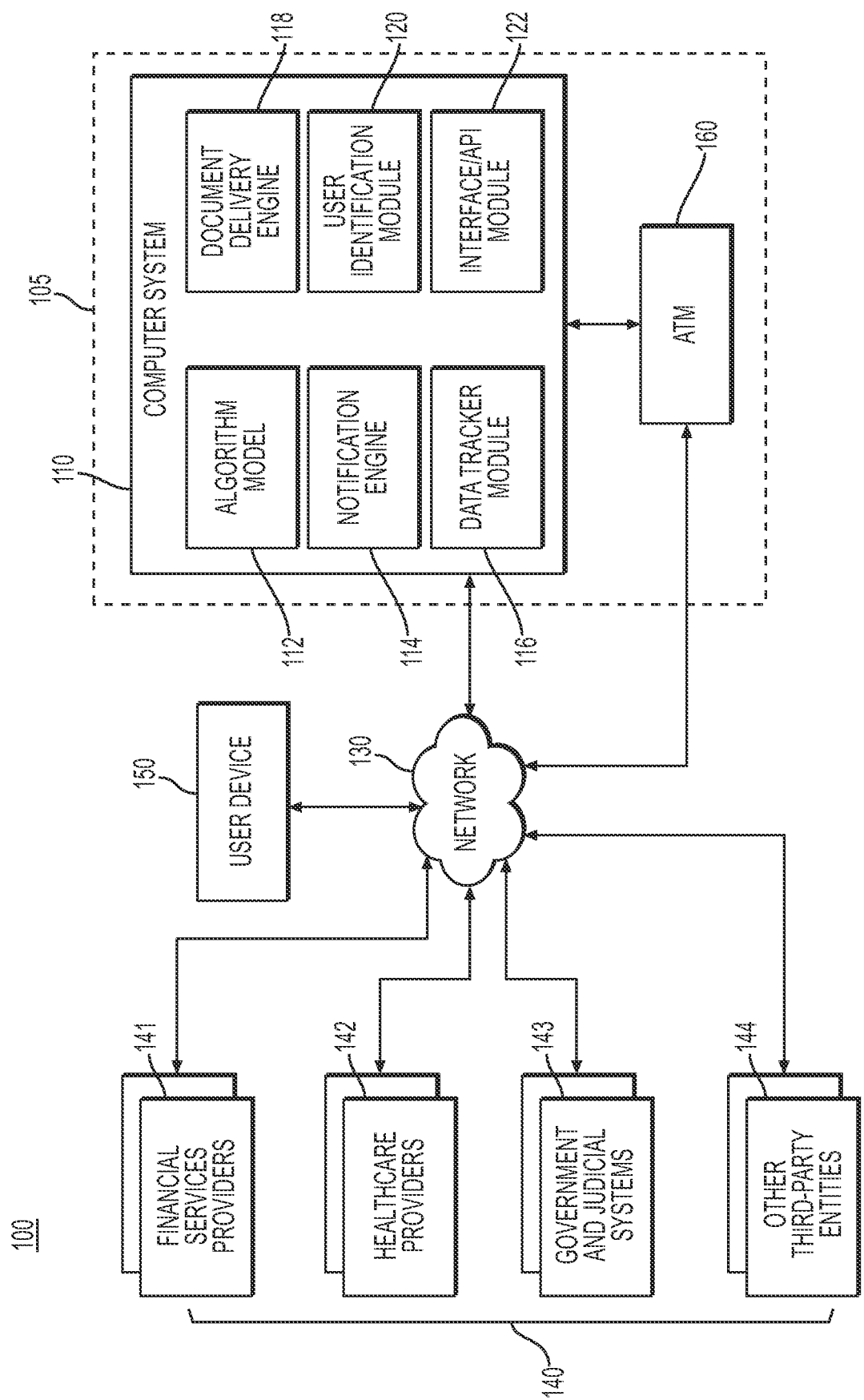
FIG. 1 depicts an exemplary system infrastructure, according to one or more embodiments.

FIG. 1 is a diagram depicting an example of a system environment 100 according to one or more embodiments of the present disclosure. The system environment 100 may include a computer system 110, a network 130, one or more resources (or third-party entities) for collecting data 140 (e.g., notification data or delivery data), a user device (or a device associated with a user) 150, and an ATM 160. The one or more resources for collecting data (or third-party entities) 140 may include financial services providers 141, healthcare providers 142, government and judicial systems 143, or other third-party entities 144. These components may be connected to one another via network 130.

The computer system 110 may have one or more processors configured to perform methods described in this disclosure. The computer system 110 may include one or more modules, models, or engines. The one or more modules, models, or engines may include an algorithm model 112, a notification engine 114, a data tracker module 116, a document delivery engine 118, a user identification module 120, and/or an interface/API module 122, which may each be software components stored in/by the computer system 110. The computer system 110 may be configured to utilize one or more modules, models, or engines when performing various methods described in this disclosure. In some examples, the computer system 110 may have a cloud computing platform with scalable resources for computation and/or data storage, and may run one or more applications on the cloud computing platform to perform various computer-implemented methods described in this disclosure. In some embodiments, some of the one or more modules, models, or engines may be combined to form fewer modules, models, or engines. In some embodiments, some of the one or more modules, models, or engines may be separated into separate, more numerous modules, models, or engines. In some embodiments, some of the one or more modules, models, or engines may be removed while others may be added.

The algorithm model 112 may be a plurality of algorithm models. The algorithm model 112 may include a trained machine learning model. Details of algorithm model 112 are described elsewhere herein. The notification engine 114 may be configured to generate and communicate (e.g., transmit) one or more notifications (e.g. confirmation) to a user device 150 or to one or more resources 140 via network 130. The data tracker module 116 may be configured to retrieve, store, or otherwise aggregate or manage current or historical data (e.g., notification data or delivery data) from the one or more resources 140. The document delivery engine 118 may be configured to deliver documents to the user through ATM 160. The delivery of the documents may occur in a number of ways, such as by paper, e-mail, or another service. The user identification module 120 may manage first identification data, second identification data, first user identification, or second user identification for each user accessing the computer system 110. In one implementation, the first identification data, second identification data, first user identification, or second user identification associated with each user may be stored to, and retrieved from, one or more components of the data storage associated with the computer system 110 or one or more resources 140. Details of the first identification data, second identification data, first user identification, and second user identification are described elsewhere herein. The interface/API module 122 may allow the user to interact with one or more modules, models, or engines of the computer system 110.

Computer system 110 may be configured to receive data from other components (e.g., one or more resources 140, user device 150, and/or ATM 160) of the system environment 100 via network 130. Computer system 110 may further be configured to utilize the received data by inputting the received data into the algorithm model 112 to produce a result (e.g., a delivery status). Information indicating the result may be transmitted to user device 150 or one or more resources 140 over network 130. In some examples, the computer system 110 may be referred to as a server system that provides a service including providing the information indicating the received data and/or the result to one or more resources 140 or user device 150.

Network 130 may be any suitable network or combination of networks and may support any appropriate protocol suitable for communication of data to and from the computer system 110 and between various other components in the system environment 100. Network 130 may include a public network (e.g., the Internet), a private network (e.g., a network within an organization), or a combination of public and/or private networks. Network 130 may be configured to provide communication between various components depicted in FIG. 1. Network 130 may comprise one or more networks that connect devices and/or components in the network layout to allow communication between the devices and/or components. For example, the network may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 130 may be implemented using cell and/or pager networks, satellite, licensed radio, or a combination of licensed and unlicensed radio.

Financial services providers 141 may be an entity such as a bank, credit card issuer, merchant services providers, or other type of financial service entity. In some examples, financial services providers 141 may include one or more merchant services providers that provide merchants with the ability to accept electronic payments, such as payments using credit cards and debit cards. Therefore, financial services providers 141 may collect and store data pertaining to transactions occurring at the merchants. In some embodiment, financial services providers 141 may provide documents (e.g., bank statement, credit score report) to be delivered to the user. The financial services providers 141 may include one or more databases to store any information related to the documents to be delivered.

Healthcare providers 142 may be an entity such as a hospital, a clinic, a research institution, or other type of healthcare entity. In some examples, healthcare providers may collect and store data pertaining to transactions occurring at the healthcare entities. In some embodiment, healthcare providers 142 may provide documents (e.g., medical examination report) to be delivered to the user. The healthcare providers 142 may include one or more databases to store any information related to the documents to be delivered.

Government and judicial systems 143 may be an entity such as IRS, a court, a police department, or other type of government or judicial entity. In some examples, government and judicial systems may collect and store data pertaining to matters occurring at the government and judicial entity. In some embodiment, government and judicial systems 143 may provide documents (e.g., tax document, subpoena) to be delivered to the user. The government and judicial systems 143 may include one or more databases to store any information related to the documents to be delivered.

Other third-party entities 144 may be any entity that is not a financial provider, healthcare provider, or government or judicial system for providing documents to be delivered to a user. The other third-party entity 144 may include a merchant or a person (e.g., family member). The other third-party entity 144 may include online resources, such as webpage, e-mail, applications ("apps"), or social network sites. Online resources may be provided by manufacturers, retailers, consumer promotion agencies, and other entities. Online resources may include other computer systems, such as web servers, that are accessible by computer system 110.

The financial services providers 141, the healthcare providers 142, the government or judicial systems 143, or any other type of third-party entities 144 may each include one or more computer systems configured to gather, process, transmit, and/or receive data. In general, whenever any of financial services providers 141, the healthcare providers 142, the government or judicial systems 143, or any other type of third-party entities 144 is described as performing an operation of gathering, processing, transmitting, or receiving data, it is understood that such operation may be performed by a computer system thereof. In general, a computer system may include one or more computing devices, as described in FIG. 4 below.

User device 150 may operate a client program, also referred to as a user application or third-party application, used to communicate with the computer system 110. This user application may be used to provide information (e.g., delivery status or confirmation) to the computer system 110 and to receive information from the computer system 110. In some examples, the user application may be a mobile application that is run on user device 150. User device 150 may be a mobile device (e.g., smartphone, tablet, pager, personal digital assistant (PDA)), a computer (e.g., laptop computer, desktop computer, server), or a wearable device (e.g., smart watch). User device 150 can also include any other media content player, for example, a set-top box, a television set, a video game system, or any electronic device capable of providing or rendering data. User device 150 may optionally be portable. User device 150 may be handheld. User device 150 may be a network device capable of connecting to a network, such as network 130, or other networks such as a local area network (LAN), wide area network (WAN) such as the Internet, a telecommunications network, a data network, or any other type of network. User device 150 may be capable of transmitting information indicating a current location of user device 150. For example, user device 150 may have an application configured to transmit data indicating a current location of user device 150 to computer system 110. User device 150 may determine a location thereof based on data obtained by a GPS included in user device 150 and/or other location estimation techniques. The computer system 110 may transmit or receive information from the user device 150 based on the location of user device 150.

An automated teller machine (ATM) 160 may be an electronic telecommunications device that enables customers or users of financial service providers (e.g., financial services providers 141) to perform financial transactions, such as cash withdrawals, deposits, transfer funds, or obtaining account information. ATM 160 may collect data of the user through one or more components associated with ATM 160. ATM 160 may also perform one or more operations (e.g., delivering a document to a user). Details of ATM 160 and one or more components thereof are described elsewhere herein.

Computer system 110 and ATM 160 may be part of an entity 105, which may be any type of company, organization, or institution. In some examples, entity 105 may be a financial services provider. In such examples, the computer system 110 may have access to data pertaining to transactions through a private network within the entity 105. For example if the entity 105 is a card issuer, entity 105 may collect and store identification data (e.g., first identification) involving a credit card or debit card issued by the entity 105. In such examples, the computer system 110 may still receive identification data from other financial services providers 141. In some cases, the computer system 110 may have access to data collected by ATM 160. In some embodiments, computer system 110 may be associated with or located within ATM 160.

Figure 2:
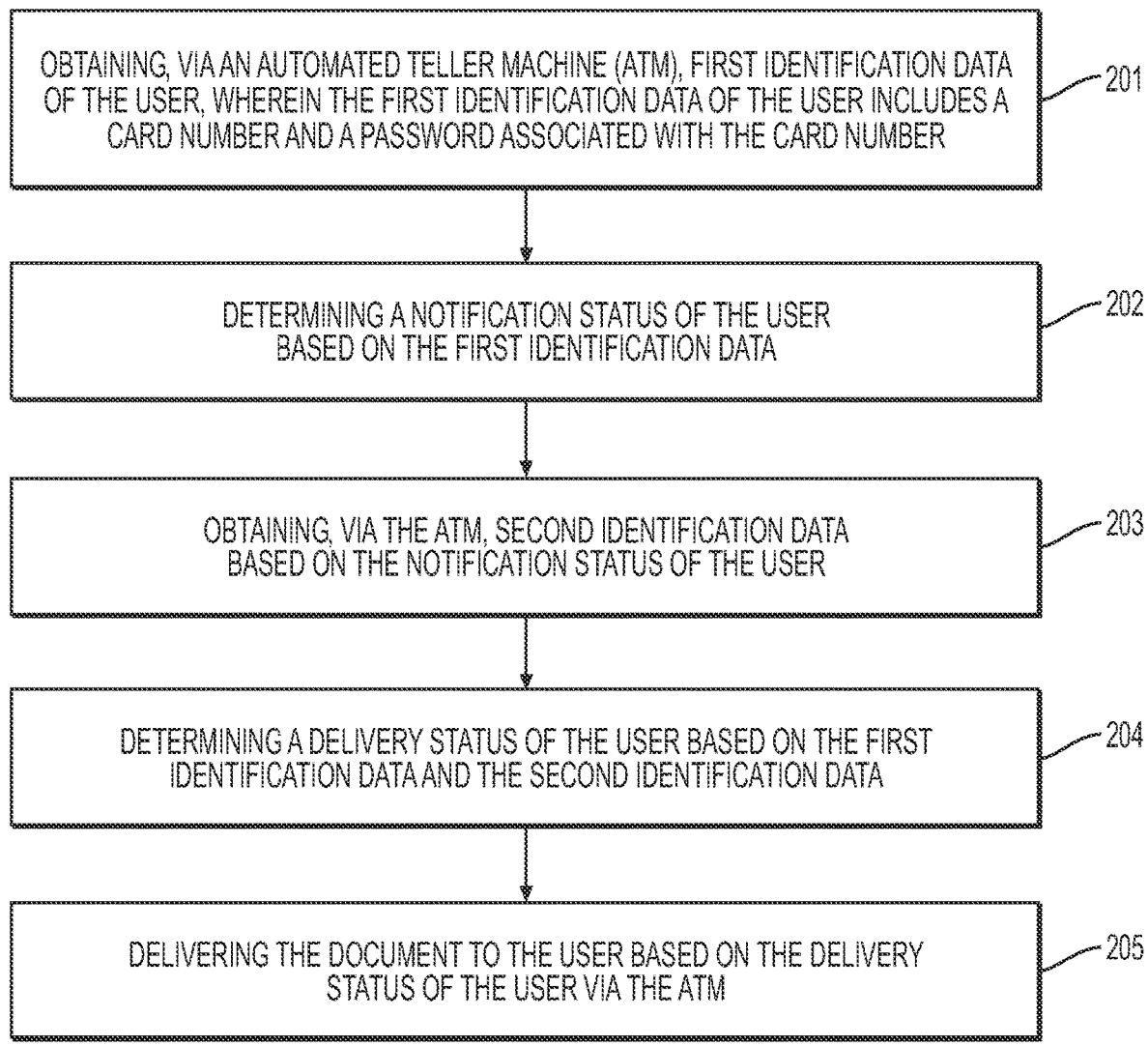
FIG. 2 depicts a flowchart of an exemplary method of delivering a document to a user, according to one or more embodiments.

FIG. 2 is a flowchart illustrating a method for delivering document to a user, according to one or more embodiments of the present disclosure. The method may be performed by computer system 110.

Step 201 may include obtaining, via an automated teller machine (ATM), first identification data of the user. The first identification data of the user may include a card number (or identification/account vehicle number) and a password associated with the card number (or associated with the identification/account vehicle number). In this disclosure, the term "card" is to be interpreted broadly to include not only cards, but any non-card identification/account vehicle documents (e.g., passport). The first identification data may further include a fingerprint of the user. The card may be a financial transaction card such as a credit card or a debit card, a membership card, a reward card, or an identification card such as a driver's license. The first identification of the user may include an actual name, a username, passwords, contact information (e.g., address, phone numbers, e-mail addresses, etc.), a social security number, biometric data, and additional information pertaining to the user. The additional information may include user preference information, demographic information (e.g., age, gender, marital status, income level, educational background, number of children in household, etc.), employment, and other data related to the user. The device associated with the user (or a user device 150) may include an electronic mobile device, as described elsewhere herein.

The obtaining the first identification data may include obtaining the first identification data through one or more components associated with ATM 160. The one or more components associated with ATM 160 may include a card reader (or identification/account vehicle reader), one or more ATM processors, a keypad, a display screen, a speaker, a printer, one or more sensors, and/or a biometric capturing device. The reader may read account information that is stored on a magnetic strip or a chip on a card (or identification/account vehicle). The one or more ATM processors may be configured to interpret the information from the card (or identification/account vehicle). The keypad may allow the user to input the first identification data (e.g., password), select what type of transaction they want to make, and communicate with the one or more ATM processors. The display screen may allow the user to see each step of the process or transaction. The speaker may capture the user's voice or allow the user to hear additional voice features of the ATM. The printer may be configured to print a receipt, a confirmation, or a document. The one or more sensors may include a proximity sensor, a radio-frequency identification tag, or a magnet to capture signals from the card, a device associated with the user (e.g., user device), or the user. The card may communicate with the one or more sensors through a near-field communication (NFC), radio-frequency identification (RFID), or Bluetooth. The biometric capturing device may be configured to capture any biometric information (e.g., fingerprint, facial image) from the user.

Step 202 may include determining a notification status of the user based on the first identification data. The notification status of the user may include whether a user should be notified about delivering a document. The document may include any certified document requiring confirmation of receipt by the user. The document may include a medical record, a tax document, a term of service document, a receipt of a mortgage, a subpoena, or any document requiring confirmation of receipt by the user.

The determining the notification status of the user may include analyzing the first identification data of the user. The analyzing the first identification of the user may be performed by user identification module 120 of the computer system 110. User identification module 120 may analyze first identification data for each user accessing the computer system 110. The first identification data may be stored to, and retrieved from, one or more components of a data storage component or memory system of the computer system 110. The analyzing the first identification of the user may include obtaining notification data from a database associated with one or more resources 140 or third-party entities and/or comparing the notification data with the identification data. The third-party entity may be any entity that may deliver the document to the user, for example, including financial services providers 141, healthcare providers 142, government and judicial systems 143, or other third-party entities 144.

The notification data may include any information that a user provides to the third-party entity, including, an actual name, a username, passwords, contact information (e.g., address, phone numbers, e-mail addresses, etc.), a social security number, biometric data, and additional information pertaining to the user. The additional information may include user preference information, demographic information (e.g., age, gender, marital status, income level, educational background, number of children in household, etc.), employment, and other data related to the user. The comparing the notification data with the first identification data may include matching the notification data with the first identification data. If the notification data matches the first identification data, then the user may be a recipient of the document to be delivered. For instance, a fingerprint of the first identification data obtained via an ATM may be compared with a fingerprint of the notification data obtained through the third-party entity to see whether there is a match (e.g., a complete match or a match equal to or exceeding a predetermined threshold of similarity). In this situation, if there is a match between these two fingerprints, then the user may be a recipient of the document to be delivered.

Prior to step 202, or at any stage of delivering document to a user, there may be a step of authenticating the user based on the first identification of the user. The authenticating the user may be initiated when the first identification of the user is obtained via ATM 160. Such first identification of the user may be obtained from the user, a card (or identification/account vehicle), and/or a device associated with the user. If the first identification of the user is obtained from the user, the user may interact with one or more components associated with the ATM 160 (e.g., a keypad, a speaker, or a biometric capturing device) to provide the first identification (e.g., password, voice, or fingerprint of the user). If the first identification of the user is obtained from a card (or identification/account vehicle), the one or more components of the ATM 160 (e.g., one or more sensors) may interact with a chip or any component of the card to obtain data from the card and start a contactless communication between the card and the ATM 160. In this situation, the user may place the card within a predetermined distance of the ATM 160 to start the authentication process or further transactions. If the first identification of the user is obtained from a device associated with the user, the one or more components of the ATM 160 (e.g., one or more sensors) may interact with any component of the device to obtain data from the device and start a contactless communication between the device and the ATM 160. In this situation, the user may open a third-party application on the device and place the device within a predetermined distance of the ATM 160 to start the authentication process or further transactions. In some embodiments, the first identification of the user may be obtained from multiple channels (e.g., a combination of two or more of the user, a card, and a device associated with the user) for one authentication. For example, the user may first type the password via a keypad associated with the ATM 160, and then place the device associated with the user next to the ATM 160 to start the authentication process or further transactions.

The authenticating the user may include comparing the first identification of the user to a prestored identification. During the authenticating process, one or more algorithms may be used to compare the identification of the user to a prestored identification and determine whether there is a match (e.g., a complete match or a match equal to or exceeding a predetermined threshold of similarity) between the first identification of the user and a prestored identification. Delivering a document may be permitted to be completed, may be stopped, or may require additional verification processes to occur, based on whether there is a match between the first identification of the user and a prestored identification.

The prestored identification may be generated when a user device (e.g., user device 150) is registered with a transaction system, an authentication system, or a transactional entity. In other embodiments, the prestored identification may be generated when a user device 150 first connects with a transaction system, an authentication system, or a transactional entity (e.g., a financial service provider, a merchant). If the user device 150 is an electronic mobile device, the prestored identification may be generated when a mobile application for authenticating identification is downloaded, installed, or running on the user device 150 for the first time. The prestored identification may be generated when a user account is registered with a transaction system, an authentication system, or a transaction entity, and the prestored identification may correspond to the user device (e.g., user device 150) used for registration of the user account. Once the prestored identification has been generated, it may be stored with other user account information and/or authentication information. The prestored identification may be stored in one or more memory units, cookies, caches, browsing histories, and/or browser fingerprints. The prestored identification may be stored in a memory on-board the user device (e.g., user device 150). The prestored identification may be distributed over multiple devices or systems (e.g., peer-to-peer, cloud-computing based infrastructure, between the reader and an external device).

Step 203 may include obtaining, via ATM 160, second identification data based on the notification status of the user. The second identification data may include any biometric data of the user. The biometric data of the user may include any information related to human characteristics of the user. The biometric data may include physiological information such as a fingerprint, palm veins, face recognition, DNA, palm print, hand geometry, iris recognition, retina or odor/ scent. The biometric data may also include behavioral characteristics related to the pattern of behavior of the user, including but not limited to typing rhythm, gait, or voice. The second identification data of the user may include an actual name, a username, passwords, contact information (e.g., address, phone numbers, e-mail addresses, etc.), a social security number, and additional information pertaining to the user. The additional information may include user preference information, demographic information (e.g., age, gender, marital status, income level, educational background, number of children in household, etc.), employment, and other data related to the user.

Obtaining the second identification data may include obtaining the second identification data via an image capture device associated with ATM 160. In this situation, the second identification data may include a facial picture of the user. The image capture device may be installed next to or as one or more components (e.g., keypad) of the ATM. The image capture device may be configured to capture one or more facial pictures of the user. The image capture device can include hardware and/or software element. In some embodiments, the image capture device may be a camera operably coupled to the user device. The image capture device can be controlled by an application/software configured to capture a facial picture of the user. In some embodiments, the software and/or applications may be configured to activate the camera to capture a facial image of the user. Obtaining the second identification data may include obtaining the second identification data via one or more sensors associated with ATM 160. The one or more sensors may include an odor sensor, a movement sensor, a touch screen, or a scanner. In this situation, the second identification data may be any information related to human characteristics of the user. In some embodiments, obtaining the second identification data may include obtaining the second identification data via one or more components associated with ATM 160.

Step 204 may include a step of determining a delivery status of the user based on the first identification data and the second identification data. The delivery status of the user may include any information about delivery of the document. The delivery status of the user may include whether a user is a recipient of the document to be delivered. The delivery status of the user may include if a user is a recipient of the document to be delivered, whether the document has been delivered. The determining the delivery status of the user may include analyzing the first identification data and the second identification data of the user. In some other embodiments, the determining the delivery status of the user may include analyzing the first identification data but not the second identification data. In this situation, the first identification data (e.g., fingerprint) may be enough to determine a delivery status of the user.

The analyzing the first identification and the second identification data of the user may be performed by user identification module 120 of the computer system 110. User identification module 120 may analyze the first identification data and the second identification data for each user accessing the computer system 110. The first identification data and/or the second identification data may be stored to, and retrieved from, one or more components of a data storage component or memory system of the computer system 110. The analyzing the first identification data and the second identification data of the user may include first analyzing the first identification data and then analyzing the second identification data. Details of analyzing the first identification data are described elsewhere herein.

The analyzing the second identification data may include obtaining delivery data from a database associated with a third-party entity and/or comparing the delivery data with the second identification data. The third-party entity may be any entity that may deliver (e.g., request delivery of) the document to the user, as described elsewhere herein. For example, delivery data may be any type of information similar to the second identification data. The delivery data may include any information that the user provides to the third-party entity, including, an actual name, a username, passwords, contact information (e.g., address, phone numbers, e-mail addresses, etc.), a social security number, and additional information pertaining to the user. The additional information may include user preference information, demographic information (e.g., age, gender, marital status, income level, educational background, number of children in household, etc.), employment, and other data related to the user. The delivery data may include any biometric data of the user. Details of the biometric data of the user are described elsewhere herein. The biometric data may include one or more facial pictures of the user. The one or more facial pictures of the user may include one or more facial pictures taken from different angles of a user's face. The comparing the delivery data with the second identification data may include matching the delivery data with the second identification data. If the delivery data matches (e.g., a complete match or a match equal to or exceeding a predetermined threshold of similarity) the second identification data, then the user may be a recipient of the document to be delivered. For instance, a facial picture obtained via ATM 160 may be compared with a facial picture of the delivery data obtained through the third-party entity to see whether there is a match. In this situation, if there is a match between these two facial pictures, then the user may be a recipient of the document to be delivered.

Step 205 may include a step of delivering the document to the user based on the delivery status of the user via the ATM. The delivering the document may include printing the document. One or more components of ATM 160 (e.g., a printer) may be used to print the document. In some embodiments, delivering the document may include delivering the document to the user in a paperless manner. The paperless manner may include an e-mail delivery, a web delivery, or a phone delivery. The user may be first informed about delivering the document on a display screen associated with the ATM. The user may then be able to choose the methods of delivering the document (e.g., printing or paperless) by interacting with the keypad or the display screen associated with the ATM. The delivered document may include instructions for the user to provide additional information regarding the delivery. The additional information may include an updated address, an updated e-mail address, an updated password, or an updated user name. In some arrangements, the additional information may be input via one or more components (e.g., touch screen, keypad) of ATM 160 or user device 150.

Before delivering the document to the user, there may be a step of obtaining, via the ATM, an instruction from the user. The instruction may include information related to user's interactions with the document to be delivered, including, for example, whether a user may accept the document to be delivered, a user preferred way of accepting the document to be delivered (e.g., printed copy, email), or a reminder set by the user to accept the document at a future time if the user does not accept the document to be delivered. The instruction may also include any information related to the document to be delivered. The obtaining the instruction from the user may include obtaining the instruction as an input via one or more components (e.g., touch screen, keypad) of ATM 160 or user device 150.

After delivering the document to the user, there may be a step of obtaining, via the ATM, a confirmation of delivering the document. The confirmation of delivering the document may include any information regarding delivering the document, including, but not limited to, the time of delivering the document, the location of delivering the document, or the document delivered during the process of delivering the document. The confirmation of delivering the document may include a photo of the user holding the document in hand. In this situation, the photo of the user holding the document in hand may be obtained by the image capture device associated with ATM 160. After obtaining the confirmation of delivering the document, there may be a step of transmitting the confirmation of delivering the document to a third-party entity. Having received the confirmation of delivering the document, the third-party entity may be able to update its database with information provided in the confirmation of delivering the document.

Figure 3:
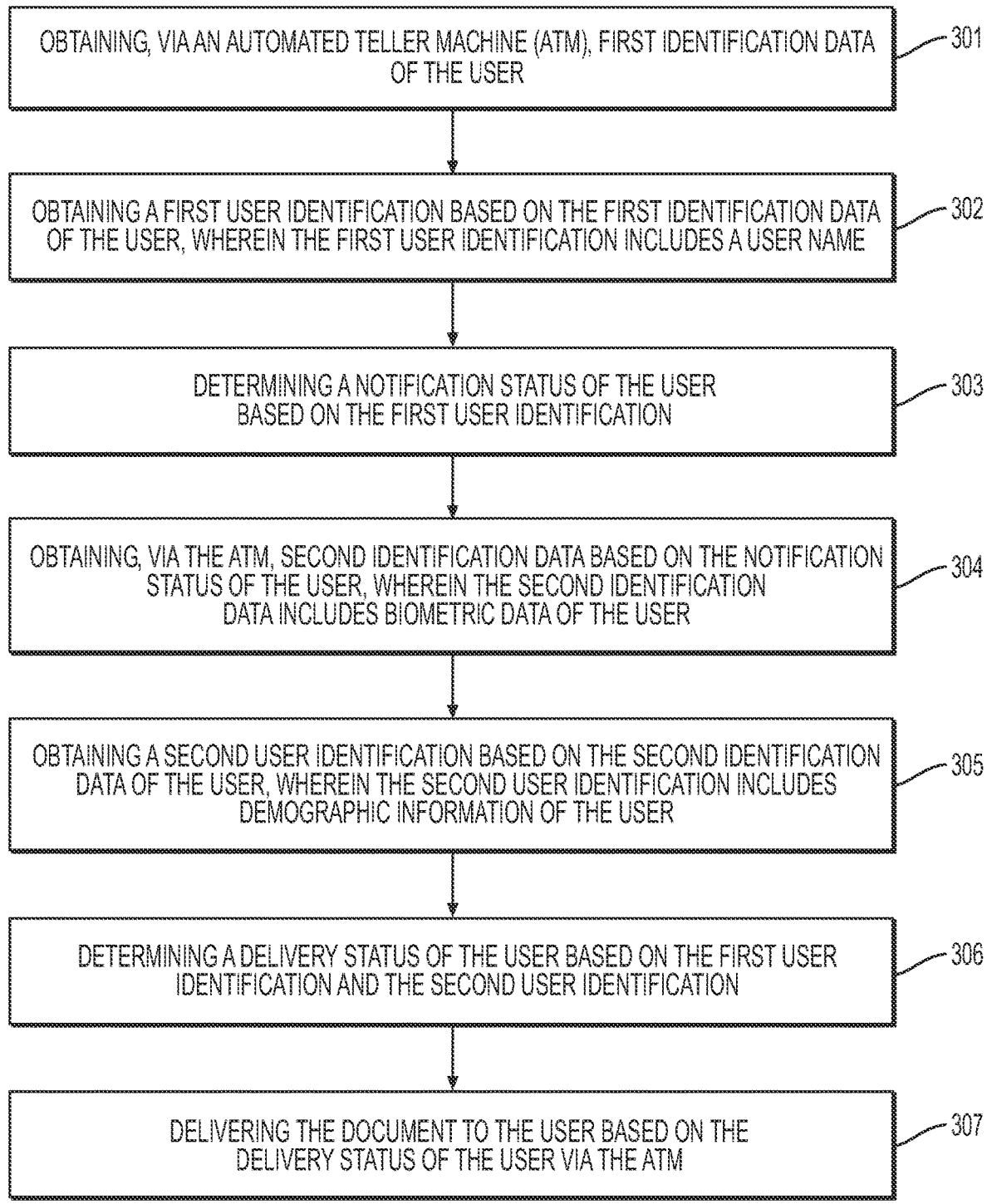
FIG. 3 depicts a flowchart of another exemplary method of delivering a document to a user, according to one or more embodiments.

FIG. 3 is a flowchart illustrating another exemplary method for delivering a document to a user, according to one or more embodiments of the present disclosure. The method may be performed by computer system 110.

Step 301, similarly to step 201 of FIG. 2, may include obtaining, via an ATM (e.g., ATM 160), first identification data of the user. The first identification data of the user may include a card number and a password associated with the card number. In some embodiments, the first identification data of the user may include a card number and a password associated with the card number and may not include other information. Details of ATM 160 and the first identification data are described elsewhere herein.

Step 302 may include obtaining a first user identification based on the first identification data of the user, wherein the first user identification includes a user name. The user name may be an actual name of the user or may not be an actual name of the user but an alias that a user creates to identify himself or herself. The first user identification may further include at least one of an address or a social security number of the user. The first user identification may include an actual name, a username, passwords, a card number, a password associated with the card number, contact information (e.g., address, phone numbers, e-mail addresses, etc.), a social security number, biometric data, and additional information pertaining to the user. The additional information may include user preference information, demographic information (e.g., age, gender, marital status, income level, educational background, number of children in household, etc.), employment, and other data related to the user.

The obtaining first user identification may be initiated when the first identification data of the user is obtained. The obtaining a first user identification may include comparing the first identification data with the first user identification. During the process of obtaining a first user identification, one or more algorithms may be used to compare first identification data with the first user identification and determine whether there is a match between first identification data and the first user identification. If there is a match (e.g., a complete match or a match equal to or exceeding a predetermined threshold of similarity), the first user identification may be obtained, and the first user identification may include more information related to a user than the information related to the first identification data. For example, the first identification data of the user may include a card number and a password associated with the card number, and the first user identification may include a card number, a password associated with the card number, and a social security number.

The first user identification may be a prestored identification. The prestored identification may be generated when a user device (e.g., user device 150) is registered with a transaction system, an authentication system, or a transactional entity. In other embodiments, the prestored identification may be generated when user device 150 first connects with a transaction system, an authentication system, or a transactional entity. If user device 150 is an electronic mobile device, the prestored identification may be generated when a mobile application for authenticating identification is downloaded, installed, or running on user device 150 for the first time. For example, the first identification data may include a card number and a password associated with the card number, and the first identification data may be compared with the first user identification, which includes a prestored card number and a prestored password associated with the card number. If the card number matches the prestored card number and/or the password associated with the card number matches the prestored password associated with the card number, the first user identification may be obtained, and the first user identification may include additional information, such as a user name, an address, or a social security number.

Step 303 may include determining a notification status of the user based on the first user identification. The notification status of the user may include whether a user should be notified about delivering a document. The document may include any certified document that requires confirmation of receipt by the user. The document may include a medical record, a tax document, a terms of service document, a receipt of a mortgage, a subpoena, or any document requiring confirmation of receipt by the user.

The determining the notification status of the user may include analyzing the first user identification. The analyzing the first identification of the user may be performed by a user identification module 120 of the computer system 110. The user identification module may analyze first user identification for each user accessing the computer system 110. The first user identification may be stored to, and retrieved from, one or more components of a data storage component or memory system of the computer system 110. The analyzing the first user identification may include obtaining notification data from a database associated with a third-party entity and/or comparing the notification data with the first user identification. The third-party entity may be any entity that may deliver the document to the user (or request delivery of the document to the user), as described elsewhere herein. The notification data may include any information that the user provides to the third-party entity, including, an actual name, a username, passwords, contact information (e.g., address, phone numbers, e-mail addresses, etc.), a social security number, biometric data, and additional information pertaining to the user. The additional information may include user preference information, demographic information (e.g., age, gender, marital status, income level, educational background, number of children in household, etc.), employment, and other data related to the user. The comparing the notification data with the first user identification may include matching the notification data with the first user identification. If the notification data matches the first user identification (e.g., a complete match or a match equal to or exceeding a predetermined threshold of similarity), then the user may be a recipient of the document to be delivered. For instance, a social security number of the first user identification may be compared with a social security number of the notification data obtained through the third-party entity to see whether there is a match. In this situation, if there is a match between these two social security numbers, then the user may be a recipient of the document to be delivered or notified about delivering a document.

Step 304 may include obtaining, via the ATM (e.g., ATM 160), second identification data based on the notification status of the user. The second identification data may include any biometric data of the user. The biometric data of the user may include any information related to human characteristics of the user. The biometric data may include physiological information such as a fingerprint, palm veins, face recognition, DNA, palm print, hand geometry, iris recognition, retina and odor/scent. The biometric data may also include behavioral characteristics related to the pattern of behavior of the user, including but not limited to typing rhythm, gait, and voice. The second identification of the user may include an actual name, a username, passwords, contact information (e.g., address, phone numbers, e-mail addresses, etc.), a social security number, and additional information pertaining to the user. The additional information may include user preference information, demographic information (e.g., age, gender, marital status, income level, educational background, number of children in household, etc.), employment, and other data related to the user. In some embodiments, the second identification data of the user may include a facial picture of the user and may not include other information.

Obtaining the second identification data may include obtaining the second identification data via an image capture device associated with ATM 160. In this situation, the second identification data may include a facial picture of the user. The image capture device may be installed next to or as one or more components (e.g., keypad) of ATM 160. Details of the image capture device are described elsewhere herein. Obtaining the second identification data may include obtaining the second identification data via one or more sensors associated with ATM 160. The one or more sensors may include odor sensor, movement sensor, touching screen, or a scanner. In this situation, the second identification data may be any information related to human characteristics of the user. In some embodiments, obtaining the second identification data may include obtaining the second identification data via one or more components associated with ATM 160.

Step 305 may include obtaining a second user identification based on the second identification data of the user. The second user identification may include demographic information of the user. The demographic information may include at least one of age, gender, eye color, or race of the user. In some embodiments, the second user identification may include any biometric data of the user. The second user identification of the user may include an actual name, a username, passwords, contact information (e.g., address, phone numbers, e-mail addresses, etc.), a social security number, and additional information pertaining to the user. The additional information may include user preference information, demographic information (e.g., age, gender, marital status, income level, educational background, number of children in household, etc.), employment, and other data related to the user.

The obtaining the second user identification may be initiated when the second identification data of the user is obtained. In some embodiments, a second identification data may be a facial picture of a user, and one or more algorithms may be utilized to analyze the facial picture of the user and generate demographic information of the user based on the facial picture. In this situation, the demographic information generated based on the facial picture may include the age, the eye color, the gender, or the race of the user. One or more algorithms may include a trained machine learning algorithm. Details of the algorithm or the trained machine learning algorithm are described elsewhere herein.

Step 306 may include determining a delivery status of the user based on the first user identification and the second user identification. The delivery status of the user may include whether a user is a recipient of the document to be delivered. The delivery status of the user may include, if a user is a recipient of the document to be delivered, whether the document has been delivered. The determining the delivery status of the user may include analyzing the first user identification and the second user identification of the user. The analyzing the first user identification and the second user identification of the user may be performed by a user identification module 120 of the computer system 110. User identification module 120 may analyze the first user identification and the second user identification for each user accessing computer system 110. The first user identification and/or the second user identification may be stored to, and retrieved from, one or more components of a data storage component or memory system of the computer system 110.

The analyzing the first user identification and the second user identification may include comparing the first user identification with the second user identification. For example, demographic information of the first user identification may be compared with the demographic information of the second user identification. If there is a match (e.g., a complete match or a match equal to or exceeding a predetermined threshold of similarity) between demographic information of the first user identification and the demographic information of the second user identification, a delivery status of the user may then be determined. In some embodiments, all demographic information of the first user identification may be matched with all demographic information of the second user identification so that a delivery status of the user can be determined. In some embodiments, some of demographic information of the first user identification may be matched with some of demographic information of the second user identification so that a delivery status of the user can be determined.

The determining the delivery status may include obtaining delivery data from a database associated with a third-party entity and/or comparing the delivery data with the second user identification. The third-party entity may be any entity that may deliver the document to the user (or request that the document be delivered to the user), as described elsewhere herein. The delivery data may be any type of information similar to the second user identification. For example, the delivery data may include any information that the user provided to the third-party entity, including, an actual name, a username, passwords, contact information (e.g., address, phone numbers, e-mail addresses, etc.), a social security number, and additional information pertaining to the user. The additional information may include user preference information, demographic information (e.g., age, gender, marital status, income level, educational background, number of children in household, etc.), employment, and other data related to the user. The delivery data may include any biometric data of the user. The biometric data may include one or more facial pictures of the user. The one or more facial pictures of the user may include one or more facial pictures taken from different angles of a user's face. The comparing the delivery data with the second user identification may include matching the delivery data with the second user identification. If the delivery data matches (e.g., a complete match or a match equal to or exceeding a predetermined threshold of similarity) the second user identification, then the user may be a recipient of the document to be delivered. For instance, demographic information of the delivery data may be compared with the demographic information of the second user identification. If there is a match between demographic information of the delivery data and the demographic information of the second user identification, a delivery status of the user may then be determined. In some embodiments, all demographic information of the delivery data may be matched with all demographic information of the second user identification so that a delivery status of the user can be determined. In some embodiments, some of demographic information of the delivery data may be matched with some of demographic information of the second user identification so that a delivery status of the user can be determined.

The obtaining the second user identification may include obtaining the second user identification via a trained machine learning algorithm. The trained machine learning algorithm may be configured to obtain at least a portion of the second user identification based on the second identification data. For example, if the second identification data is a facial picture of the user, the trained machine learning algorithm may be configured to obtain the age and gender of the user based on the facial picture, because age and gender may be factors to define the second user identification of the user. At any stage of delivering a document to a user, the method may further include retrieving identification data, a user identification, a notification status, or a delivery status of one or more customers other than the user; and determining the second user identification, delivery status, or notification status of the user via a trained machine learning algorithm. The identification data, user identification, notification status, or delivery status of one or more customers other than the user may be stored in a non-transitory computer-readable medium or one or more databases.

The trained machine learning algorithm may include a regression-based model that accepts identification data, a user identification, a notification status, or a delivery status of a user or one or more customers other than the user as input data. The trained machine learning algorithm may be part of the algorithm model 112. The trained machine learning algorithm may be of any suitable form, and may include, for example, a neural network. A neural network may be software representing human neural system (e.g., cognitive system). A neural network may include a series of layers termed "neurons" or "nodes." A neural network may comprise an input layer, to which data is presented; one or more internal layers; and an output layer. The number of neurons in each layer may be related to the complexity of a problem to be solved. Input neurons may receive data being presented and then transmit the data to the first internal layer through connections' weight. A neural network may include a convolutional neural network, a deep neural network, or a recurrent neural network. The machine learning algorithm may be trained by supervised, unsupervised or semi-supervised learning using training sets comprising data of types similar to the type of data used as the model input. For example, the training set used to train the model may include any combination of the following: identification data, a user identification, a notification status, or a delivery status of one or more customers other than the user; or identification data, a user identification, a notification status, or a delivery status of a user.

After delivering the document to the user, there may be a step of obtaining, via the ATM, a confirmation of delivering the document. The confirmation of delivering the document may include any information regarding delivering the document, including, but not limited to, the time of delivering the document, the location of delivering the document, or the document delivered during the process of delivering the document. The confirmation of delivering the document may include a photo of the user holding the document in hand. In this situation, the photo of the user holding the document in hand may be obtained by the image capture device associated with ATM 160. After obtaining the confirmation of delivering the document, there may be a step of transmitting the confirmation of delivering the document to a third-party entity. Having received the confirmation of delivering the document, the third-party may be able to update its database with information provided in the confirmation of delivering the document.

In any situation, if a user refuses to collect the document, there may be a step of recapturing the document. The recapturing the document may include withdrawing the document into ATM 160 in response to a failure/refusal of the user to collect the document. The recapturing the document may further include destroying (e.g., shredding) the document. After recapturing the document, there may be a step of obtaining, via ATM 160, a failure message indicative of a failure to deliver the document. The failure message may include any information regarding failing to deliver the document, including, but not limited to, the time of the failed attempt to deliver the document, the location of the failed attempt to deliver the document, or the document that was failed to be delivered. After obtaining the failure message, there may be a step of transmitting the failure message to a third-party entity. Having received the failure message, the third-party may be able to update its database with information provided in the failure message.

In general, any process discussed in this disclosure that is understood to be computer-implementable, such as the processes illustrated in FIGS. 2-3, may be performed by one or more processors of a computer system, such as computer system 110, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as computer system 110, ATM 160, and/or user device 150, may include one or more computing devices. If the one or more processors of the computer system 110, ATM 160, and/or user device 150 are implemented as a plurality of processors, the plurality of processors may be included in a single computing device or distributed among a plurality of computing devices. If a computer system 110, ATM 160, and/or user device 150 comprises a plurality of computing devices, the memory of the computer system 110, ATM 160, and/or user device 150 may include the respective memory of each computing device of the plurality of computing devices.

Figure 4:
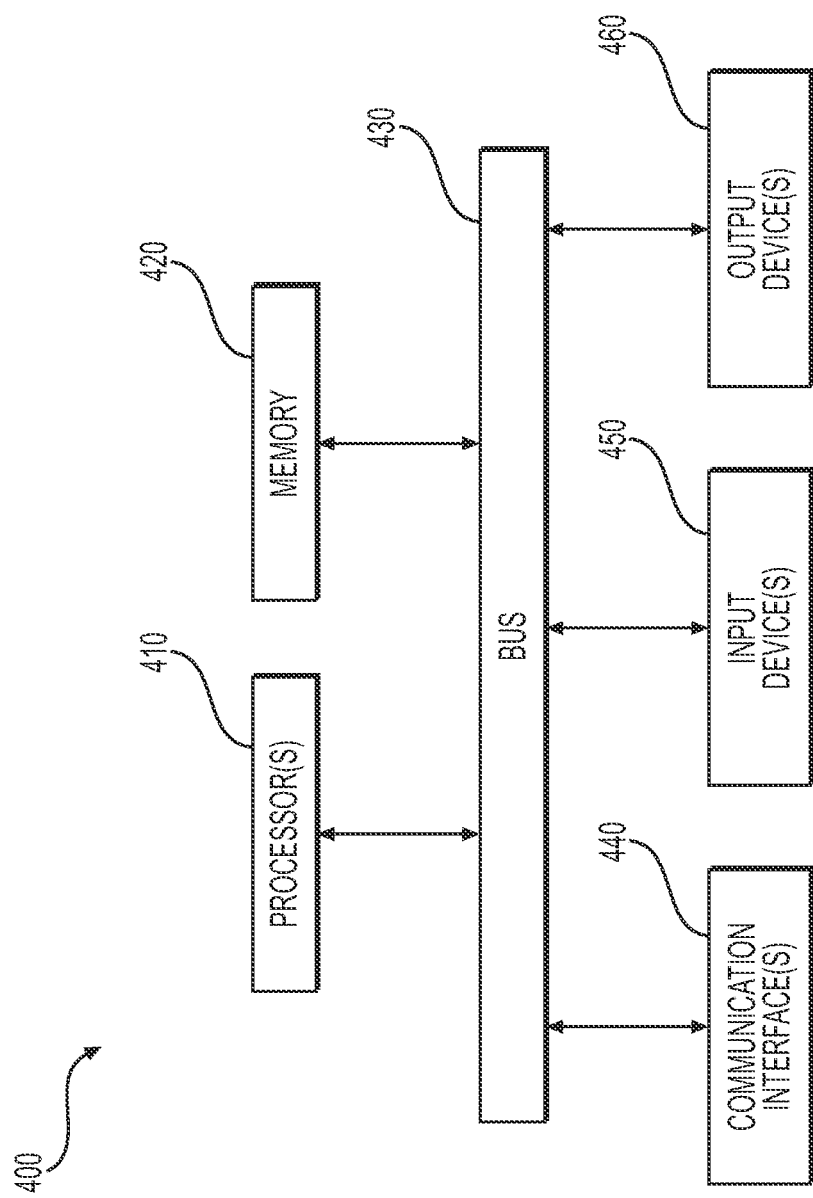
FIG. 4 depicts an example of a computing device, according to one or more embodiments.

FIG. 4 illustrates an example of a computing device 400 of a computer system, such as computer system 110 and/or user device 150. The computing device 400 may include processor(s) 410 (e.g., CPU, GPU, or other such processing unit(s)), a memory 420, and communication interface(s) 440 (e.g., a network interface) to communicate with other devices. Memory 420 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 420. The computing device 400 may, in some embodiments, further include input device(s) 450 (e.g., a keyboard, mouse, or touchscreen) and output device(s) 460 (e.g., a display, printer). The aforementioned elements of the computing device 400 may be connected to one another through a bus 430, which represents one or more busses. In some embodiments, the processor(s) 410 of the computing device 400 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method for delivering a document to a user, the computer-implemented method comprising:
    obtaining, via an interaction between the user and an automated teller machine (ATM), first identification data of the user;
    determining a notification status of the user based on the first identification data, by:
        obtaining notification data from a database remote from the ATM and associated with one or more third-party entities; and
        comparing the obtained notification data with the first identification data to identify one or more documents to be delivered to the user from the one or more third-party entities;
    upon identifying the one or more documents to be delivered to the user, automatically obtaining, via the ATM, second identification data of the user that is different than the first identification data;
    determining a delivery status of the user based on the first identification data and the second identification data, wherein the delivery status includes a determination of one or more of (i) whether the user is a recipient of the one or more documents to be delivered and (ii) whether the one or more documents have previously been delivered; and
    delivering the one or more documents to the user based on the delivery status of the user, via the ATM.

2. The computer-implemented method of claim 1, wherein the interaction between the user and the ATM is unrelated to delivery of the one or more documents.

3. The computer-implemented method of claim 1, further comprising:
    obtaining, via the ATM, a confirmation of delivery of the one or more documents to the user.

4. The computer-implemented method of claim 3, wherein:
    the confirmation includes an image of the user at a time and location that the document is delivered; and
    the image of the user depicts the user holding the document.

5. The computer-implemented method of claim 3, further comprising:
transmitting the confirmation of delivering the one or more documents to a corresponding third-party entity of the one or more third-party entities.

6. The computer-implemented method of claim 1, wherein delivering the one or more documents includes printing the one or more documents via the ATM.

7. The computer-implemented method of claim 1, wherein the first identification data includes data associated with an ATM card of the user.

8. The computer-implemented method of claim 1, wherein obtaining second identification data includes using at least one sensor of the ATM to capture data indicative of one or more pattern associated with a behavioral characteristic of the user.

9. The computer-implemented method of claim 8, wherein the one or more pattern is associated with one or more of a typing rhythm, a walking gait, or voice of the user.

10. The computer-implemented method of claim 8, wherein obtaining the second identification data further includes using a machine-learning algorithm to determine the one or more pattern based on the data captured by the at least one sensor.

11. A computer-implemented method for delivering a document to a user, the computer-implemented method comprising:
obtaining, via an interaction between the user and an automated teller machine (ATM), first identification data of the user;
determining a notification status of the user based on the first identification data, the notification status identifying one or more documents to be delivered to the user;
upon identifying the one or more documents to be delivered to the user, automatically obtaining, via the ATM, second identification data of the user that is different than the first identification data, wherein obtaining the second identification data includes using at least one sensor of the ATM to capture data indicative of one or more pattern associated with a behavioral characteristic of the user;
determining a delivery status of the user based on the first identification data and the second identification data, wherein the delivery status includes a determination of one or more of (i) whether the user is a recipient of the one or more documents to be delivered and (ii) whether the one or more documents have previously been delivered; and
delivering the one or more documents to the user based on the delivery status of the user, via the ATM.

12. The computer-implemented method of claim 11, wherein the interaction between the user and the ATM is unrelated to delivery of the one or more documents.

13. The computer-implemented method of claim 11, further comprising:
obtaining, via the ATM, a confirmation of delivery of the one or more documents to the user.

14. The computer-implemented method of claim 13, wherein:
the confirmation includes an image of the user at a time and location that the document is delivered; and
the image of the user depicts the user holding the document.

15. The computer-implemented method of claim 13, further comprising:
transmitting the confirmation of delivering the one or more documents to a corresponding third-party entity of one or more third-party entities.

16. The computer-implemented method of claim 11, wherein delivering the one or more documents includes printing the one or more documents via the ATM.

17. The computer-implemented method of claim 11, wherein the first identification data includes data associated with an ATM card of the user.

18. The computer-implemented method of claim 11, wherein the one or more pattern is associated with one or more of a typing rhythm, a walking gait, or voice of the user.

19. The computer-implemented method of claim 18, wherein obtaining the second identification data further includes using a machine-learning algorithm to determine the one or more pattern based on the data captured by the at least one sensor.

20. An Automated Teller Machine (ATM), comprising:
a memory storing instructions;
at least one sensor; and
one or more processors configured to execute the instructions to perform operations including:
obtaining, via an interaction between a user and the ATM, first identification data of the user;
determining a notification status of the user based on the first identification data, by:
obtaining notification data from a database remote from the ATM and associated with one or more third-party entities; and
comparing the obtained notification data with the first identification data to identify one or more documents to be delivered to the user from the one or more third-party entities;
upon identifying the one or more documents to be delivered to the user, automatically obtaining second identification data of the user that is different than the first identification data, wherein obtaining the second identification data includes using the at least one sensor of the ATM to capture data indicative of one or more pattern associated with a behavioral characteristic of the user;
determining a delivery status of the user based on the first identification data and the second identification data, wherein the delivery status includes a determination of one or more of (i) whether the user is a recipient of the one or more documents to be delivered and (ii) whether the one or more documents have previously been delivered; and
delivering the one or more documents to the user based on the delivery status of the user.

* * * * *